H. T. SLEE.
INTERCOMMUNICATING TELEPHONE SYSTEM.
APPLICATION FILED DEC. 4, 1913.
1,138,255.
Patented May 4, 1915.
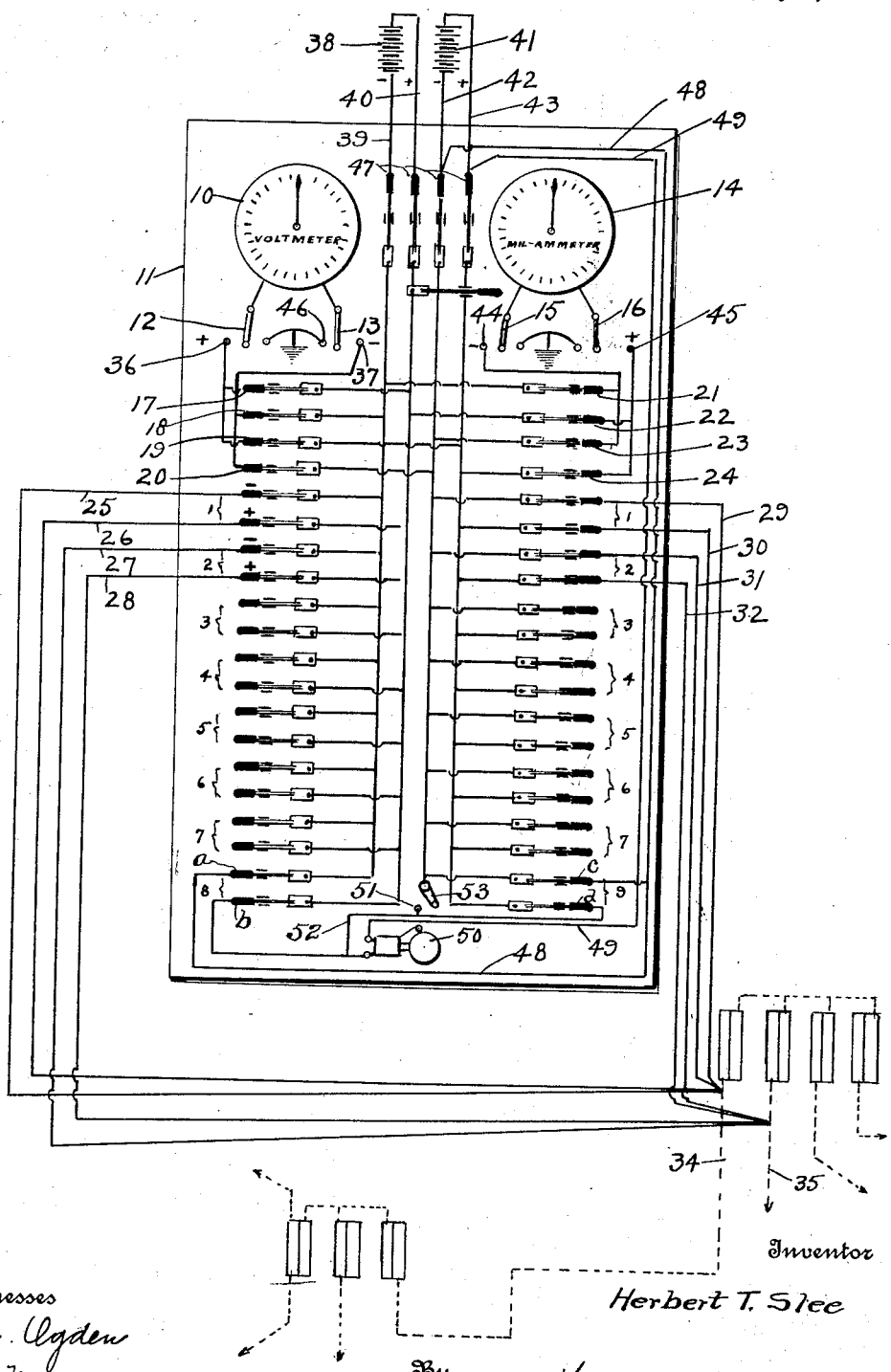
Witnesses
E. E. Ogden
J. L. Macdermott
Inventor
Herbert T. Slee
By
Howard E. Barlow
Attorney

UNITED STATES PATENT OFFICE.

HERBERT TEAL SLEE, OF WARWICK, RHODE ISLAND.

INTERCOMMUNICATING TELEPHONE SYSTEM.

1,138,255.  Specification of Letters Patent.  Patented May 4, 1915.

Application filed December 4, 1913. Serial No. 804,604.

*To all whom it may concern:*

Be it known that I, HERBERT T. SLEE, a subject of the King of England, and resident of Warwick, in the county of Kent and State of Rhode Island, United States of America, have invented certain new and useful Improvements in Intercommunicating Telephone Systems, of which the following is a specification.

This invention relates to a system of wiring and switches for a test board for a central battery intercommunicating telephone system, and has for its object to provide an arrangement of wires for a system of this character whereby a short circuit or ground may be readily located without disturbing any of the wires in the system with the exception of those in which the trouble is located.

In the ordinary telephone wiring system of this character now in use, the different sets of wires, such as positive and negative talking, and positive and negative ringing wires, are grouped and soldered or otherwise connected together at different branches over the system and when any trouble occurs, such as short circuiting or grounding the electrician is obliged to unsolder and disconnect these groups of wires, which naturally puts the whole system out of commission until the trouble can be located and remedied, after which the wires must again be resoldered together before the service can be restored. Being obliged to throw the whole system out of commission simply for the purpose of locating the trouble on a single wire, is an extremely annoying condition and indicates that such a system is incomplete. To obviate this very serious difficulty I have devised a system of wiring a test-board, whereby by the operation of a system of switches the man in charge can readily determine in which branch of the system the trouble exists, without appreciable interruption of service. By a manipulation of these switches he locates the trouble in a certain branch of the system, then by testing in the usual manner, through the different telephones of that branch, he locates the particular troublesome telephone, which is then disconnected and repairs made in the usual way. This single instrument, then, is the only one out of commission during the time the repair is being effected.

A further object of my invention is to provide the switch board with a voltmeter and a mil-ammeter, whereby it is only necessary to position certain switches to readily ascertain the condition of the batteries, either in volts or amperes, and also, by again manipulating the switches I am enabled, by means of this volt meter, to also test the condition of the different lines throughout the system, and if a ground or short circuit exists it will at once be indicated on the volt meter or on the bell and the trouble may be remedied in the manner hereinafter described.

A further object of the invention is the arrangement of wires and an auxiliary or separate set of switches whereby all of the talking and ringing wires may be at once disconnected and tests made for short circuits through each pair of wires separately, and when the trouble has been found, by the positioning of the different switches on the board, it will at once be indicated by the ringing of a bell, (or by means of the volt meter above described.) In other words, by the old method the whole telephone system is put out of commission as soon as the test for trouble is commenced, while by my improved system the trouble may be readily located without appreciable interruption of the service and only the instrument affected is rendered inoperative while the trouble is being removed.

With these and other objects in view, the invention consists of certain novel features of construction, as will be more fully described and particularly pointed out in the appended claims.

The figure in the accompanying drawing is a diagrammatic view illustrating a general arrangement of the switches and wires in my improved test board.

By "test-board" in the broad sense in the specification and claims, I mean a limited zone or district through which a certain class of wires extend, which in the present instance are the talking and ringing wires connected with the different telephone instruments in the system, and within which zone a series of switches are arranged for controlling communication through said wires, and instruments are also provided within said zones for indicating existing trouble in the wires of the system.

Referring to the drawings 10 designates a volt meter positioned on the switch board 11, beneath which meter is located a two-way switch arm 12, and a second two-way switch arm 13. On the opposite side of the board is mounted a mil-ammeter 14 from which is led a two-way switch arm 15 and a second two-way switch arm 16. The first four switches 17, 18, 19 and 20 at the left below the volt meter are arranged for the taking of voltage readings, and the first four switches 21, 22, 23 and 24 at the right are arranged for the taking of mil-ammeter readings. The pairs of switches from 1 to 7 on either side of the board are connected by wires to the various cables of the different branches as indicated by the wires 25 to 32 inclusive, which wires are the only ones deemed necessary to show in this drawing for illustrating the operation of my invention, those connected to the other switches being omitted. In other words, a pair of talking and a pair of ringing wires are included in each branch or cable and the number of such cables determine the number of feed wires and switches for controlling the same that shall be mounted upon the test board. For instance, the pair of wires 25 and 26 and 29 and 30, constituting the talking and ringing wires, are connected to the cable 34, while wires 27 and 28 and 31 and 32 are connected to the second cable 35, and so on, one pair from each side of the board is connected to each cable.

When it is desired to take a battery reading the switch 12 is moved to the point 36 on the positive side and the switch 13 is moved to the point 37 on the negative side, which connects the volt meter with the circuit. The first two knife switches 17 and 18 are positioned and the current from the talking battery 38 passes through the main talking lines 39 and 40 and the voltage of the talking batteries is indicated on the volt meter. Then by withdrawing these switches 17 and 18 and inserting switches 19 and 20 the voltage of the ringing batteries 41 passes in through wires 42 and 43 and the voltage of these batteries is then indicated. To find the amperage of these batteries the levers 15 and 16 are placed on the positive and negative points 44 and 45 respectively and then by manipulating the levers 21 and 22 and then 23 and 24, in the manner of operating the corresponding switches on the opposite side of the board as above described, the amperage of the talking and ringing batteries may be indicated respectively on the mil-ammeter.

In testing for grounds the lever 12 is placed on the point 36, and the lever 13 is connected to the ground point 46, next the switch 17 is connected and if the negative side of the talking batteries is grounded a reading will be obtained on the volt meter of the amount of ground. Next, switch 17 is withdrawn and switch 19 is connected, which will indicate if the negative side of the ringing batteries are grounded. The same test can be made through the switches 18 and 20 to ascertain if the positive side of either of these batteries is grounded. Ground on the battery lines are also indicated by similar process, that is, if a ground of six volts, for instance, appears on the negative side of talking batteries the switches are arranged as follows:—The connections remain on the volt meter as before, switch 17 remains in position, the first one or the plus of each of the different pairs of switches from 1 to 7 down the board, which distribute current through the plus talking wire of the various branches, is withdrawn and quickly replaced, noting by means of the volt meter whether or not the trouble disappears. This quick withdrawing and replacing of the switch does not perceptibly interrupt the service. If the trouble does not disappear, proceed to the other switches in like manner until by the removing of the right one the trouble will show on the voltmeter as having disappeared. When the trouble has thus been located the switches feeding this cable may be withdrawn and then each of the telephone instruments on this particular cable will be tested out until the trouble is definitely located. When this telephone itself is disconnected and the switches controlling this cable are replaced leaving only the single one affected instrument disconnected, the rest of the service is uninterrupted. The same procedure is followed to ascertain the trouble in either of the poles when either of the talking wires or either of the ringing wires are grounded.

To test for a short circuit the series of four switches 47, which connect the main battery lines 39 to 43 inclusive, are withdrawn, the pair of switches 8 at the lower end of the board is then positioned. The current then must pass from the battery 41 through wires 48 and 49 and bell 50, and if this bell does not ring no short circuit of the circuit exists. If it does ring, withdraw and return each one of the pair of switches from 1 to 7, on the left of the board, one at a time, as was done in the other tests. If the trouble is not located it is not in this side of the board. Then withdraw the pair of switches 8 and insert the pair of switches 9 and continue the manipulation of the different levers on the right of the board until the bell is silent which indicates the location of the defective branch and repairs are made in the usual manner.

It is found in applying my improved testboard to some systems of telephone wiring that by positioning the switches $a$ and $b$ of the pair 8 a short circuit through any of the positive or negative talking lines, or on any of the party lines, if existing, would be indicated by the ringing of the bell 50. If it is found that a short circuit does exist, then it is known that the short is either on the battery feed wires or on the party line. To determine whether it is the party lines or the talking battery lines I remove switch $b$ and insert switch $a$ of the pair 8, which is the negative talking, and switch $c$ of the pair 9, which is the positive ringing. If now the bell should continue to ring it would indicate a short on the party line which may be readily remedied in the usual way.

In order to provide another method or means for determining a short as to whether it is on the party or the battery feed line I have mounted an auxiliary switch 53, which is connected to the wire 42, on the negative side of the ringing battery wire, and may be connected to the contact 51 on the wire 52, which leads from one pole of the bell to switch $9^d$. In making this test for shorts the switch 53 is connected to the point 51, switch $8^a$ is inserted, and if the bell 50 should ring a short on the party line is indicated.

I have illustrated and described one arrangement of levers and system of wiring a test board for a central battery intercommunicating telephone system, but I do not wish to be restricted to this particular form of wiring, or to the particular arrangement of the switches, as the same may be arranged in many different ways to perform the same general function. Neither do I wish to be restricted to the use of my improved test board in a central battery intercommunicating telephone system as the same may be employed in any system of telephone wiring for which it may be adapted without departing from the spirit and scope of my invention.

I claim.

1. In a telephone wiring system, a test board comprising two series of wires extending through said board from the batteries to the different telephones for talking and ringing, the talking wires being arranged on one portion and the ringing wires on another portion of the board, an independent switch for each wire whereby communication therethrough may be momentarily interrupted, and means in the system for indicating trouble.

2. In a telephone system, a test board comprising a plurality of wires and switches connecting the batteries and telephone instruments for talking and ringing, means for readily disconnecting the battery current from all of said wires, means for supplying current to any pair of lines to test for short circuit therethrough, and means for indicating when a short occurs.

3. In a telephone wiring system, a test board comprising a plurality of wires and switches connecting the batteries and telephone instruments for talking and ringing, a separate set of switches controlling the mains from the batteries for disconnecting said battery current from all of said wires, a separate pair of wires, a pair of switches through which current may be supplied to any pair of lines, and means for indicating when a short circuit is found.

4. In a telephone system, a test board comprising a plurality of wires and switches connecting the batteries and telephone instruments for talking and ringing, means for readily disconnecting the battery current from all of said wires, means for supplying current to any pair of lines to test for short circuit therethrough, and means in the system for indicating when trouble exists therein.

In testimony whereof I affix my signature in presence of two witnesses.

HERBERT TEAL SLEE.

Witnesses:
 HOWARD E. BARLOW,
 E. I. OGDEN.